United States Patent [19]
Fox

[11] 3,934,895
[45] Jan. 27, 1976

[54] BOWLING BAG CART

[76] Inventor: George G. Fox, 2692 Craig Drive, Des Plaines, Ill. 60018

[22] Filed: Nov. 20, 1974

[21] Appl. No.: 525,555

[52] U.S. Cl. .......................... 280/47.26; 280/DIG. 3
[51] Int. Cl.² ............................................ B62D 1/12
[58] Field of Search ............ 280/47.24, 47.26, 36 C, 280/DIG. 3; 190/18 A

[56] References Cited
UNITED STATES PATENTS

| | | | |
|---|---|---|---|
| 1,099,933 | 6/1914 | Pohrer | 280/47.17 |
| 1,554,034 | 9/1925 | Richie | 280/DIG. 3 |
| 2,598,831 | 6/1952 | Ramey | 280/47.26 X |
| 3,558,157 | 1/1971 | Neumann | 280/47.24 X |
| 3,827,707 | 8/1974 | Bierman | 280/47.24 X |

FOREIGN PATENTS OR APPLICATIONS

| | | | |
|---|---|---|---|
| 965,360 | 2/1950 | France | 280/36 C |
| 124,928 | 4/1919 | United Kingdom | 280/47.24 |
| 1,084,761 | 9/1967 | United Kingdom | 280/47.17 |
| 1,122,062 | 7/1968 | United Kingdom | 280/DIG. 3 |
| 333,384 | 11/1958 | Switzerland | 280/47.24 |

*Primary Examiner*—Leo Friaglia
*Assistant Examiner*—John A. Pekar
*Attorney, Agent, or Firm*—Dominik, Knechtel, Godula & Demeur

[57] ABSTRACT

A wheeled cart for a bowling bag having forward wheels mounted to a base portion and means associated with the base portion for securing a bowling bag onto said base portion. A retractable handle is fixed along the bottom to the forward part of the cart so that a pulling motion on the handle tilts the cart forwardly so that the cart and mounted bag may be trundled along a support surface.

7 Claims, 7 Drawing Figures

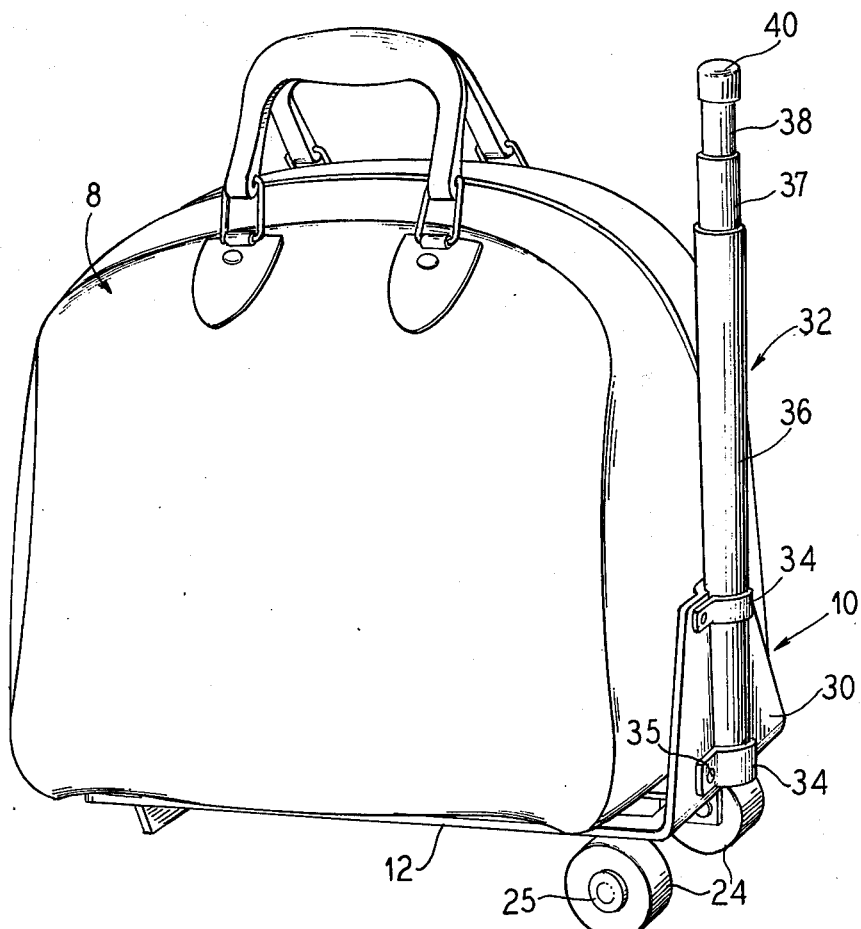
Fig. 1
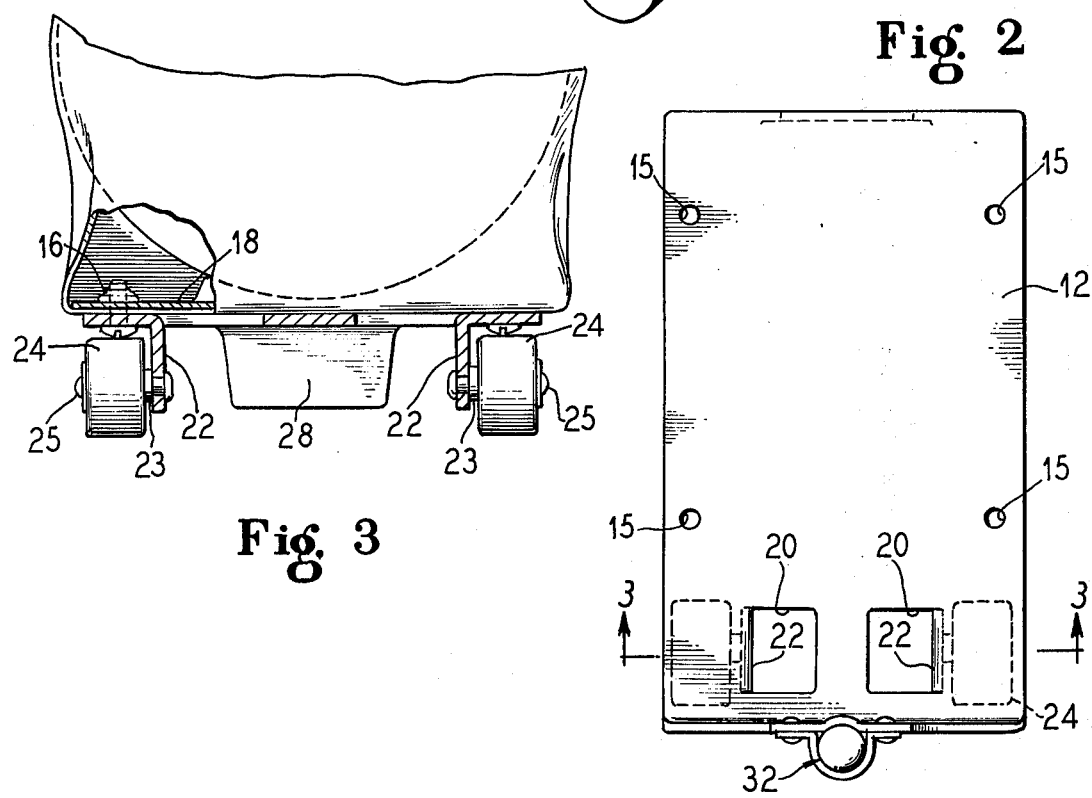
Fig. 2
Fig. 3

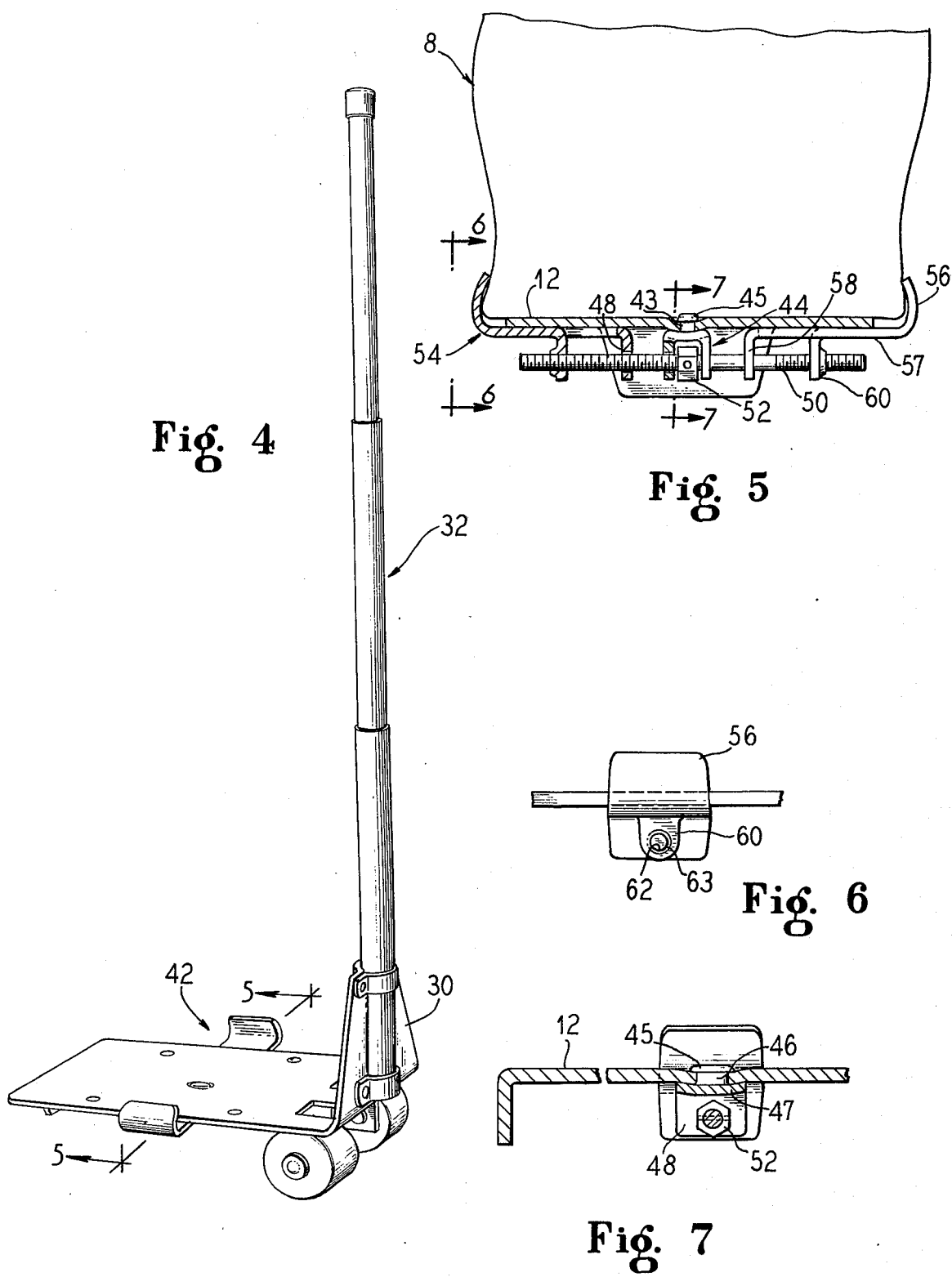

BOWLING BAG CART

This invention relates to a cart for a bowling bag; and further relates to an assembly of a bowling bag mounted to said bowling cart.

Bowling is an extremely popular activity, and great numbers of participants in this activity seriously approach the game by acquiring personal bowling balls and bags to carry such balls. Participants in this game are burdened by the substantial weight of the bowling ball when carrying the ball in a bag between a point of origin and the bowling leagues. The substantial mass of the bowling ball becomes more burdensome the longer the distance which must be travelled by carrying such bag and ball. Such burdens, inconvenience and fatigue to the bowler can be markedly reduced by providing means to facilitate and lighten the burden of transporting the bagged bowling balls.

It is accordingly one object of the invention to provide a bowling cart provided with features particularly adapted to be utilized to advantage in transporting or trundling a bag and bowling ball.

Another object of the invention is a cart for a bowling bag which in itself does not impose objectionable burdens in transporting; and having modest area and mass so as not to unduly increase the burden of manually transporting the assembly of bag and bowling bag cart if desired.

Yet another object of the present invention is a bowling bag cart which can be used in an improved assembly of cart and bowling bag with ball, which cart is economical to manufacture, is rugged in construction, is substantially free from hazards of breakdown in use, and which provides versatility in that it may be both carried and used to trundle or roll a bag and ball along a support surface.

Still yet another object is a bowling cart for a bag and bowling ball having the advantageous features described, and which additionally has means to removably or permanently secure a bag to said bowling cart.

Such objects are now attained together with still other objects which will occur to practitioners upon considering the invention in the following disclosure, which include drawings wherein:

FIG. 1 is a perspective view of the assembly of bowling bag and bowling cart;

FIG. 2 is a top plan view of the bowling cart with bag removed;

FIG. 3 is a sectional view taken along line 3—3 of FIG. 2; and additionally portionally showing a bowling bag mounted to the top surface;

FIG. 4 is a perspective view of a bowling bag cart including adjustable features for securing a bowling bag to the base portion of such cart;

FIG. 5 is a sectional view, on an enlarged scale, taken line 5—5 of FIG. 4;

FIG. 6 is a portional side view along line 6—6 of FIG. 5; and

FIG. 7 is a sectional view on an enlarged scale, with portions removed, along line 7—7 of FIG. 5.

Looking now at the drawings, there is seen in the views of FIGS. 1 and 2 a bowling bag designated generally as 8 mounted in secured position onto a bowling bag cart shown generally as 10. Such cart has a substantially planar base 12 shown as having a rectangular configuration. The base is shown with a plurality of mounting holes 15 to receive fastener assemblies of nuts and bolts shown collectively as 16, such fastener assembly passing through the bag bottom 18 of the bowling bag. It is seen that the rectangular base 12 has an area to support at least a major portion of the area of the bag bottom 18.

The forward end of the base is shown as having a pair of cut-outs 20 formed by downwardly bending wheel brackets 22. Wheel axels 23 and wheels 24 are secured to the wheel bracket by nut and washer assemblies 25. Only a forward pair of wheels 25 are shown mounted below the base towards the front which is the preferred embodiment. The wheels may have different sizes and styles, but prefereably are inboard of the sides with a minor diameter relative to a side dimension of the base to facilitate carrying.

A rear rest blade 28 extends downwardly for support surface contact when the assembly is not being trundled or rolled along said support surface. The opposite forward end of the bowling cart has an upwardly bent front plate 30 which has the configuration of a truncated pyramid, the bottom extending to the opposite sides of the base. It is seen in the preferred embodiment that the plane of the front plate 30 is substantially normal to the plane of the base 12.

A retractable handle shown generally as 32 is fixed along its lower end to the front plate 30. A pair of metal straps 34 are shown securing the lower end of the handle, such straps being fixed to the front plate by fasteners such as screws 35. The handle includes a number of telescoping tubular portions, shown herein as a lowermost portion 36 secured to the front plate, an intermediate portion 37 and an upper portion 38. A cap 40 is shown closing the upper tubular portion 38.

The alternative embodiment shown in FIGS. 4–8 is provided with adjustable clamping means 42 to removably mount and secure the bowling bag to the cart. The clamping means engage opposite bottom side portions of the bowling bag to clamp such portions against adjoining edge portions of the bag bottom 18.

The illustrated clamping means are mounted to the base of the bowling cart by providing a substantially centrally located opening 43 in which is mounted a yoke element 44. The yoke element includes an enlarged head rivet 45 atop the neck 46 which, in turn, is joined to shoulder element 47. The opposite ends of the shoulder element carry depending arms 48, each of which is provided with enlarged passageways 49. A threaded rod 50 moves freely through the enlarged passageways 49 of the yoke element and a nut 52 is fixed to the rod at a location between the spaced arms 48 of the yoke element.

The adjustable clamping means include movable side clamp members 54. Each side clamp member 54 has an outer upwardly extending portion 56 which is inwardly curved. The upwardly extending portion 56 is joined to an intermediate horizontal portion 57 which extends in bearing relationship to the underside of the base 12. The intermediate portion 57 is joined to an inner downwardly extending portion 58 which is provided with an enlarged bore (not shown) through which the rod 50 freely passes. The side clamp member 54 also includes an outer downwardly extending portion 60 which has a threaded bore 62 surrounded by annular ridge 63. The threaded bore 62 engages threaded portions on rod 50.

In use, the bag bottom of a bowling bag is either permanently secured as shown in FIGS. 1–3, or is removably secured to the base as shown in FIGS. 4–7. The retracted handle 32 does not extend above beyond the handle 64 of the bowling bag as shown in FIG. 1 when the assembly is either stored or manually transported or carried. The vertical positioning of the retractable handle relative to the base of the cart prevents the handle from being awkwardly contacted by the user when carried or moved about. It is seen from the view of FIG. 1 that such a retracted handle is closely positioned to the front of the bag and is compactly and neatly associated with such bag.

When it is desired to trundle or roll the assembly along a support surface, then the handle is extended as shown in the view of FIG. 4. The user pulls the extended handle towards himself to tilt the cart and bag with bowling ball towards him so that the forwardly positioned wheels can represent generally the center of gravity to allow rolling movement of the cart and ball to be conducted with facility. Securely fixing the bottom end of the retractable handle 32 to the front plate 30 permits ease in tilting the cart in use as well as allowing easy pulling of the loaded cart. It will be appreciated that the front plate 30 cooperates importantly in supporting the loaded bowling bag when the cart is tilted and trundled along the support surface.

It will be appreciated that means other than the threaded rod and bores may be provided for adjusting clamping means to capture opposite side edge portions of the bowling bag. For example, the horizontal portions 57 of the clamping members may have their inner ends slotted in overlapping relationship, and secured by a simple wing nut. Still other embodiments will occur to practitioners.

The base portion has an area related to the area of one bag bottom, or two bag bottoms if the cart is modified for that purpose. Professional or serious bowlers often transport two balls and their bags. The base area is large enough to support at least a major portion of the bag bottom area, and such base area is not substantially enlarged relative to the area of said bag bottom or bottoms. A single double ball bag can be provided, preferably held by a plurality of spaced clamping means, when such are used in the removable bag embodiment. A pair of bags are preferably oriented so the ends of an axis between the handles on each bag intersect opposite sides of the base.

The claims of the invention are now presented and the terms of such claims may be further understood by reference to the language of the preceding specification and the views of the drawings.

What is claimed is:

1. A bowling bag cart which includes
   a substantially planar support base, said base having an area to at least support a major portion of the bottom area of a bowling bag and not being substantially enlarged relative to said bottom area of the bowling bag,
   a forward pair of wheels rotatably mounted to the bottom of said base portion,
   a downwardly extending rear rest member in the bottom of the base to support said cart in resting position,
   means for holding the bottom of the bag to said base portion,
   a front plate at the forward end of the base, the plane of said front plate being substantially normal to the plane of the base portion, and
   a retractable handle having a plurality of telescoping tubular portions including a lower and an upper tubular portion, said lower portion being securely fixed to a face of the front plate, the retracted position of said handle not extending beyond at least carrying handles at the top of the bowling bag, and the extended position of the handle allowing hand pulling action to trundle the cart along a support surface.

2. A bowling bag cart which includes the features of claim 1 above wherein said front plate extends substantially to the opposite sides of said base to support a bowling bag placed thereon when the bowling cart is tilted forwardly by pulling the handle to support said cart on the forward pair of wheels.

3. A bowling bag cart which includes the features of claim 1 above wherein said means for holding the bottom of the bag is an adjustable clamping member positioned at each of the opposite sides of the base, and means to secure the clamping members in a moved position.

4. A bowling bag cart which includes the features of claim 1 wherein said means for holding the bottom of the bag to the base includes a plurality of mounting holes on the base, and fastener assemblies for moving through the bottom of a bowling bag to secure said bag permanently to the base.

5. A bowling bag cart which includes the features of claim 1 and which further includes, in combination, a bowling bag mounted on the top of the base and secured thereto by said means for holding the bottom of the bag to said base.

6. A bowling bag cart and bowling bag combination which includes the features of claim 5 above wherein said bag is permanently secured to the base by a plurality of fastening elements extending through the bottom of the bottom of the bowling bag.

7. A bowling bag cart and bowling bag combination which includes the features of claim 5 above wherein said bowling bag is removably mounted to the base by an adjustable clamping member positioned at each of the opposite sides of the base, and said clamping members including means to allow said members to be adjustably moved and secured in the selectively moved position.

* * * * *